United States Patent

[11] 3,596,346

| [72] | Inventors | Stanley G. Berkley<br>Colchester;<br>Irwin Segalman, Bloomfield; Perry<br>Goldberg, West Hartford, all of, Conn. |
|---|---|---|
| [21] | Appl. No. | 812,858 |
| [22] | Filed | Apr. 2, 1969 |
| [45] | Patented | Aug. 3, 1971 |
| [73] | Assignee | United Aircraft Corporation<br>East Hartford, Conn. |

[54] METHOD FOR JOINING METALS
8 Claims, No Drawings

[52] U.S. Cl. .................................................. 29/494,
29/498, 117/107.2 P
[51] Int. Cl. ....................................................B23k 31/02,
B23k 35/38
[50] Field of Search............................................. 117/107.2
P; 29/498, 494

[56] References Cited
UNITED STATES PATENTS

| 3,088,192 | 5/1963 | Turner .......................... | 29/498 X |
| 3,096,205 | 7/1963 | DeGuisto ...................... | 117/107.2 |
| 3,108,013 | 10/1963 | Pao Jen Chao et al........ | 117/107.2 |
| 3,145,466 | 8/1964 | Fedusko ....................... | 29/498 X |
| 3,257,230 | 6/1966 | Wachtell et al................ | 117/107.2 |
| 3,497,945 | 3/1970 | Green........................... | 29/498 X |

*Primary Examiner*—John F. Campbell
*Assistant Examiner*—Ronald J. Shore
*Attorney*—Richard N. James ABSTRACT: A process for joining metals is described wherein the metals are concurrently coated and diffusion bonded in a dry impregnating pack at a temperature of 2,000°—2,550 F.

METHOD FOR JOINING METALS

BACKGROUND OF THE INVENTION

The present invention relates in general to the joining of metals and, more particularly, to methods for joining the high temperature alloys by diffusion bonding techniques.

Diffusion bonding as a manufacturing process is well known as evidenced, for example, by the U.S. patent to Keeleric No. 3,327,382. In the typical process of this type the two surfaces to be joined are held together under pressure at high temperature until the desired joint is effected through a solid-state diffusion mechanism. The reaction is sensitive not only to time, temperature and pressure but also to the condition of the mating surfaces particularly insofar as surface cleanliness and surface-to-surface contact are concerned.

In many instances it has been found necessary to utilize a third material at the joint interface to facilitate the bonding process. This interface material, which is usually dissimilar in chemistry to the metal being joined, is typically provided either to reduce the temperature or pressure required for bonding or to protect the mating surfaces from contamination either before or during the brazing cycle. When surface protection is the primary factor necessitating the interface material, it is common practice to provide such material as a plate on one or both of the surfaces to be joined prior to the actual bonding sequence.

SUMMARY OF THE INVENTION

The present invention relates to a concurrent coating-diffusion bonding technique, particularly as applied to the fabrication of components from the alloys characterized by high-melting points. In general, it contemplates the diffusion bonding of such alloys in a coating environment at very high temperature.

In a preferred embodiment of the invention, two parts formed from the nickel-base and cobalt-base alloys are positioned together with the surfaces to be joined in intimate contact in a retort containing a source of the coating material, and heated to a temperature in excess of 2,000° F. for a period of time sufficient to coat the parts and to, at the same time, form a diffusion bond between the mating surfaces.

In a particular preferred embodiment, two nickel-base alloy parts are packed in a retort in a chromizing mixture, with the surfaces to be joined in intimate contact, and heated at a temperature of 2,000°—2,550° F. to form a coating of at least 0.001 inch on the parts, usually 0.003—0.005 inch.

DESCRIPTION OF THE PREFERRED EMBODIMENTS

Although not confined thereto, the present bonding technique is particularly adapted to the fabrication of gas turbine engine components of complex geometry. In many of the advanced engines, component design is such that the joint areas are inaccessible and, hence, not adapted to processing by conventional welding techniques. Furthermore, the environments in which these components are typically utilized effectively precludes the use of brazing materials.

Such components are typically formed from the nickel-base or cobalt-base superalloys including such alloys as those listed below:

| Alloy | Composition by Weight |
| --- | --- |
| TD Nickel | 2.2% $ThO_2$, bal. Ni |
| Udimet 700 | 15% Cr, 18.5% Co, 0.07% C, 3.3% Ti, 4.3% Al, 5% Mo, 0.03% B, bal. Ni |
| MAR M302 | 21.5% Cr, 0.85% C, 1% Fe, 10% W, 9% Ta, 0.25% Zr, Bal. Co |
| Hastelloy X | 22% Cr, 1.5% Co, 9% Mo, 0.2% C, 18.5% Fe, 0.6% W, balance Ni |
| NX 188 | 8% Al, 18% Mo, bal. Ni |

These and other similar alloys can be and frequently are coated by pack cementation methods to produce a protective surface layer of coating. Such methods in general involve embedding the articles to be coated in a dry impregnating pack comprising a quantity of powdered inert mineral filler material, a source of coating material, and a source of halogen vapor. The pack is sealed and heated to a relatively high temperature. The coating metal, evidently through some interaction with the halogen vapor, is transported to the surface to be coated and is diffused thereinto.

There are a wide variety of material which have been used not only as the source of coating material but also as the inert filler and the halide activator. One such pack comprises a mixture of chromium or chromium alloy powders, ammonium chloride and activated alumina, which when heated to a temperature of 1800°—2100° F. has been utilized to form a protective chromium rich surface or coating on the nickel-base alloys.

Gas turbine engine parts formed from the TD Nickel metal and fabricated in the shape of interlocking conical rings have been concurrently coated and diffusion bonded in a pack mixture comprising, by weight, about 20 percent chromium powder, 77 percent activated alumina, and about 3 percent halogen activator including ammonium chloride. The parts were assembled and embedded in the pack which was heated to a temperature of 2,000—2,350° F. to achieve a coating buildup of about 0.003 inch.

It was found that good bonding could be achieved with very light pressures. Good bonding was achieved even in the face of some irregularities at the joint interface as these were eliminated by the deposition of chromium and a subsequent interdiffusion with the substrate materials. This is unique to the concurrent coating-diffusion bonding process herein described. In general, irregularities or surface-to-surface spacings of up to about 0.0005 inch are tolerable in the process However, while the present process is, in general, more tolerant of surface imperfections than conventional diffusion bonding processes, it is still extremely important to carefully establish and maintain the proper fit and condition between mating surfaces. Accordingly, the parts utilized were carefully sized and carefully cleaned to provide the best possible surface conditions consistent with reasonable production practices.

Another significant advantage of the diffusion bonding process described is the fact that oxides at the mating surfaces are removed in the chromizing atmosphere, since the coating gases are reducing to the surface oxides at the deposition temperatures involved. Furthermore, inasmuch as the nickel-base and cobalt-base alloys are frequently coated in high-temperature engine applications, the concurrent coating-diffusion bonding process provides a significant advantage in terms of production economy. It should not be implied, however, that coating of the parts cannot be done prior to the diffusion bonding process, but both coated and uncoated parts have been joined by the concurrent coating-diffusion bonding technique, but rather that usually coating is not mandatory prior to the bonding operation. And this is true even in the case of difficult-to-process materials such as TD Nickel.

The concurrent coating-diffusion bonding process further results in the elimination of crevices and stress concentrations in the assembly through a buildup of the coating in corners and the like, resulting not only in a well-bonded structure but also one wherein potential failure sites are eliminated.

In the preceding description, particular attention has been directed to the processing of those materials having utility in gas turbine engine applications, and particularly those alloys usable in the hotter sections of such engines. The process described, however, is of broader significance and applicable in general not only to the so-called superalloys but also to the lesser alloys, including those limited in actual practice to temperatures of about 1,800° F. Furthermore, the description refers to pack cementation processes when describing the process in detail. This is the process most commonly used in the coating of superalloys for jet engine uses. However, for the purposes of the present invention, other coating methods such as vacuum vapor deposition are also suitable, as long as the diffusion bonding is conducted in the coating environment.

The invention in its broader aspects is not limited to the exact details described, for obvious modifications will occur to those skilled in the art.

What I claim is:

1. A process for joining metallic components which comprises:
   positioning the components together with the surfaces to be joined in intimate contact; and
   concurrently coating and diffusion bonding the components together in a reducing atmosphere of coating vapor at a temperature in excess of about 1,800° F.

2. A process according to claim 1 wherein:
   the coating vapor is metallic chromium.

3. A process for joining components formed of the nickel-base and cobalt-base alloys which comprises:
   positioning the components together with the surfaces to be joined in intimate contact; and
   concurrently coating and diffusion bonding the components together in a pack cementation process at a temperature in excess of 2,000 F.

4. A process for joining components formed of the nickel-base and cobalt-base alloys which comprises:
   embedding the components in a dry impregnating pack comprising a source of chromium vapor, a source of halogen vapor, and an inert mineral filler material, with the surfaces to be joined positioned in intimate contact; and
   heating the pack to a temperature of at least 2,000 F. to coat the components to a thickness of at least 0.001 inch and to concurrently diffusion bond said surfaces of the components.

5. A process according to claim 4 in which:
   the pack is heated to a temperature of 2,000°–2,550° F.; and
   the components are coated to a thickness of 0.002–0.005 inch.

6. A process for joining two nickel-base alloy components which comprises:
   positioning the components with the surfaces to be joined in intimate contact; and
   concurrently diffusion bonding said surfaces chromizing the components in a pack cementation process at a temperature of 2,000°–2,550° F. to a coating depth of 0.002–0.005 inch.

7. A process according to claim 6 wherein:
   the alloy is a dispersion strengthened nickel-base alloy.

8. A process according to claim 7 wherein:
   the alloy consists essentially of about 2 weight percent thoria, balance nickel.